United States Patent
Yoshida et al.

(10) Patent No.: US 6,762,990 B2
(45) Date of Patent: Jul. 13, 2004

(54) DISC CARTRIDGE AND DISC APPARATUS

(75) Inventors: Mitsunobu Yoshida, Tenri (JP); Toshiyuki Tanaka, Moriguchi (JP); Nobuyuki Usui, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/739,811

(22) Filed: Dec. 20, 2000

(65) Prior Publication Data

US 2001/0004305 A1 Jun. 21, 2001

(30) Foreign Application Priority Data

Dec. 21, 1999 (JP) ............................................. 11-362077

(51) Int. Cl.⁷ ................................................. G11B 3/70
(52) U.S. Cl. ..................................................... 369/291
(58) Field of Search ........................... 369/291; 360/132

(56) References Cited

U.S. PATENT DOCUMENTS

| | | | | |
|---|---|---|---|---|
| 4,573,572 A | * | 3/1986 | Kato et al. ................... | 360/132 |
| 4,646,285 A | * | 2/1987 | Ogusu et al. ................ | 369/291 |
| 4,926,411 A | * | 5/1990 | Ouwerkerk et al. ........ | 369/291 |
| 5,150,354 A | * | 9/1992 | Iwata et al. ................. | 369/291 |
| 5,537,389 A | * | 7/1996 | Kuwa et al. ................ | 369/291 |
| 6,198,718 B1 | * | 3/2001 | Watanabe et al. ........... | 369/291 |

FOREIGN PATENT DOCUMENTS

| | | |
|---|---|---|
| EP | 0352918 | 1/1990 |
| EP | 0797195 A2 | 9/1997 |
| EP | 0947986 A1 | 10/1999 |
| JP | 4-274067 | 9/1992 |

OTHER PUBLICATIONS

Patent Abstracts of Japan, vol. 010, No.250, (P–491), Aug. 28, 1986, JP 61 077176A published Apr. 19, 1986.

* cited by examiner

Primary Examiner—George J. Letscher
Assistant Examiner—C R Magee
(74) Attorney, Agent, or Firm—Birch, Stewart, Kolasch & Birch, LLP

(57) ABSTRACT

A disc cartridge includes at least a magneto-optical disc and a cartridge (upper shell) storing the magneto-optical disc in a rotatable manner and having an opening provided in a region including a position corresponding to a predetermined rotation center of the magneto-optical disc. The opening is longer on a forward side in the disc cartridge insertion direction (on the Y-direction side) with respect to the position corresponding to the rotation center than on a backward side in the disc cartridge insertion direction (on the X-direction side) along a straight line passing through the position corresponding to the rotation center and parallel to the disc cartridge insertion direction. Thus, a disc cartridge and a disc unit which are constructed to allow the disc cartridge to be smoothly loaded are provided.

10 Claims, 7 Drawing Sheets

FIG. 6 (a)   PRIOR ART
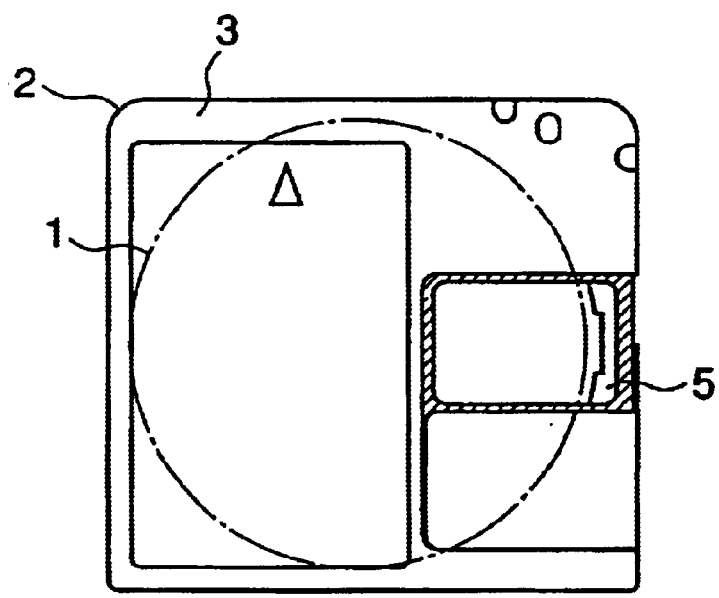
FIG. 6 (b)   PRIOR ART
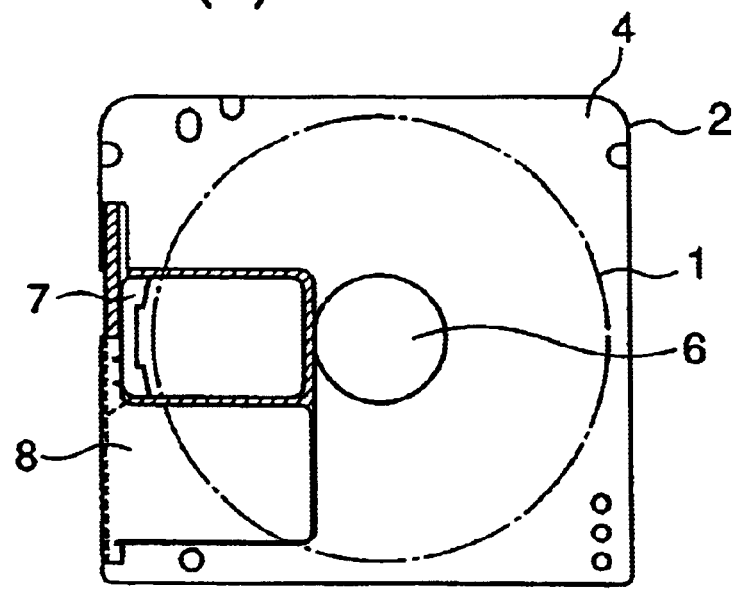

DISC CARTRIDGE AND DISC APPARATUS

CROSS-REFERENCE TO RELATED APPLICATION

This application is related to Japanese Patent Application No. Hei 11(1999)-362077 filed on Dec. 21, 1999, whose priority is claimed under 35 USC § 119, the disclosure of which is incorporated by reference in its entirety.

BACKGROUND OF THE INVENTION

1. Field of the Invention

The present invention relates to a disc cartridge for discs in general such as a magneto-optical recording medium (hereinafter as magneto-optical disc), and a disc unit to which such a cartridge is mounted.

2. Description of the Background Art

A disc cartridge for a magneto-optical disc will be described as an example of a conventional disc cartridge. FIG. 6(a) is a top plan view of the disc cartridge as an example, and FIG. 6(b) is a bottom view thereof. The shutter is open both in FIGS. 6(a) and 6(b).

In FIGS. 6(a) and 6(b), the disc cartridge 2 comprises an upper shell 3, a lower shell 4, a shutter 8. In the disc cartridge 2, a magneto-optical disc 1 recorded with information signals is rotatably stored. The upper shell 3 has a first opening 5 to which a magnetic head (not shown) for recording/reproducing information signals faces. The lower shell has a second opening 6 to which a spindle motor (not shown) for rotatably holding the magneto-optical disc 1 faces, and a third opening 7 to which a pick up unit (not shown) for recording/reproducing information signals faces.

The disc cartridge 2 described above as a whole is mounted into a magneto-optical recording/reproducing apparatus for recording/reproducing information.

A top loading method, one method of mounting such a magneto-optical disc to a magneto-optical recording/reproducing apparatus, will be now described in conjunction with FIG. 7.

A spindle motor 13 and a cartridge holder 12 which holds and mounts the disc cartridge 2 are provided at the main chassis 10 of the magneto-optical recording/reproducing apparatus. The cartridge holder 12 has an approximately box-like shape, and has an opening at a backward side in the direction for inserting the disc cartridge 2 (the X-direction side in FIG. 7) so as to insert the disc cartridge 2. The rotation supporting point 16 of the cartridge holder 12 is provided at a forward side in the direction for inserting the disc cartridge 2 (the Y-direction side in FIG. 7), and the cartridge holder 12 may be rotated so as to attach/detach the disc cartridge 2 to/from the apparatus. The main chassis 10 is provided with a reference shaft 11 which has its positional relation to the spindle motor 13 controlled, and the reference shaft is fitted into a reference hole 9 provided at the disc cartridge 2 for positioning.

The disc cartridge 2 is loaded as follows. As the cartridge holder 12 is uplifted, the disc cartridge 2 is pressed and inserted tightly into the inside of the cartridge holder 12 to the abutting end, and then the cartridge holder 12 is gradually lowered so that the reference shaft 11 and the center hole of the magneto-optical disc 1 are fitted to the reference hole 9 and the rotary shaft 14 of the spindle motor, respectively. Thus, the loading is completed.

The reference shaft 11 described above has a tapered tip end, and therefore even in the case where the disc cartridge 2 is not sufficiently pressed in, the reference hole 9 of the disc cartridge 2 can slide along the tip end of the reference shaft 11, so that the cartridge can be mounted to the apparatus.

In the disc cartridge 2 loaded in the above described manner, a turntable 15 is inserted to the second opening 6. The second opening 6 is formed in a circular form centered on the standard rotation center of the magneto-optical disc 1, and the size is set to a minimum necessary size slightly larger than the turntable 15 in consideration of errors which may occur in attaching the spindle motor 13 in the apparatus, errors in positioning the disc cartridge 2 to the apparatus, or deviation or variation of each part, as well as a problem associated with the strength of the disc cartridge 2.

In the conventional disc cartridge and the magneto-optical recording/reproducing apparatus described above, if the disc cartridge 2 is not sufficiently pressed in, the second opening 6 of the disc cartridge 2 can collide against the tip of the turntable 15 of the spindle motor 13 as the disc cartridge 2 slides along the reference shaft 11 of the main chassis 10 (part A in FIG. 7).

Particularly in the case of a compact disc cartridge standard having a small thickness with the turntable 15 of the spindle motor 13 being located at a high position, the height of the reference shaft 11 of the main chassis 10 is restricted, and therefore the disadvantage as described above is more likely to be encountered.

SUMMARY OF THE INVENTION

The present invention is directed to a solution to the above problem, and it is an object of the present invention to provide a disc cartridge and a disc unit which allow the disc cartridge to be smoothly loaded.

The present invention provides a disc cartridge comprising a disc and a cartridge for rotatably storing the disc and having an opening provided in a region including a position corresponding to a predetermined rotation center of the disc, wherein the opening is offset in a forward direction of inserting the disc cartridge from the position corresponding to the rotation center.

The present invention provides a disc apparatus comprising a disc cartridge at least including a disc and a cartridge rotatably storing the disc, and a disc driving body having a turntable and mounting the disc cartridge, wherein the disc driving body includes a shaft and a cartridge holder, the cartridge has a reference hole for positioning the disc cartridge at the mounting of it, the cartridge holder having a pivoting point and an opening which is formed on a backward side along a direction of inserting the disc cartridge from the pivoting point, and turning on the pivoting point to allow the turntable to be fitted into the opening and the shaft to be inserted in the reference hole.

BRIEF DESCRIPTION OF THE DRAWINGS

FIGS. 6(a) and 6(b) are a top plan view and a bottom view, respectively, for use in illustration of a conventional disc cartridge.

DESCRIPTION OF THE PREFERRED EMBODIMENTS

Figure 1:
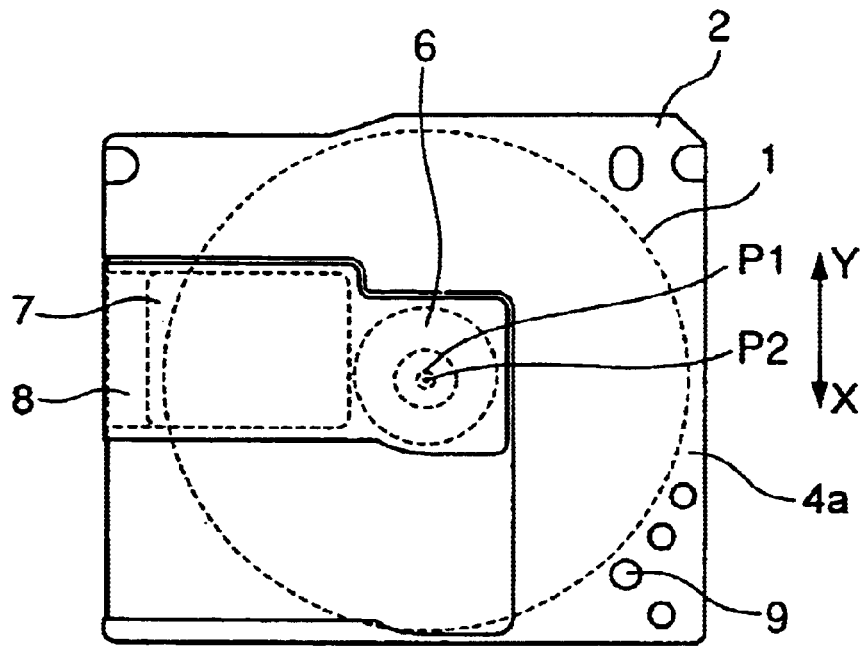
FIGS. 1(a) and 1(b) are bottom views of a disc cartridge according to one embodiment of the present invention.
Figure 1:
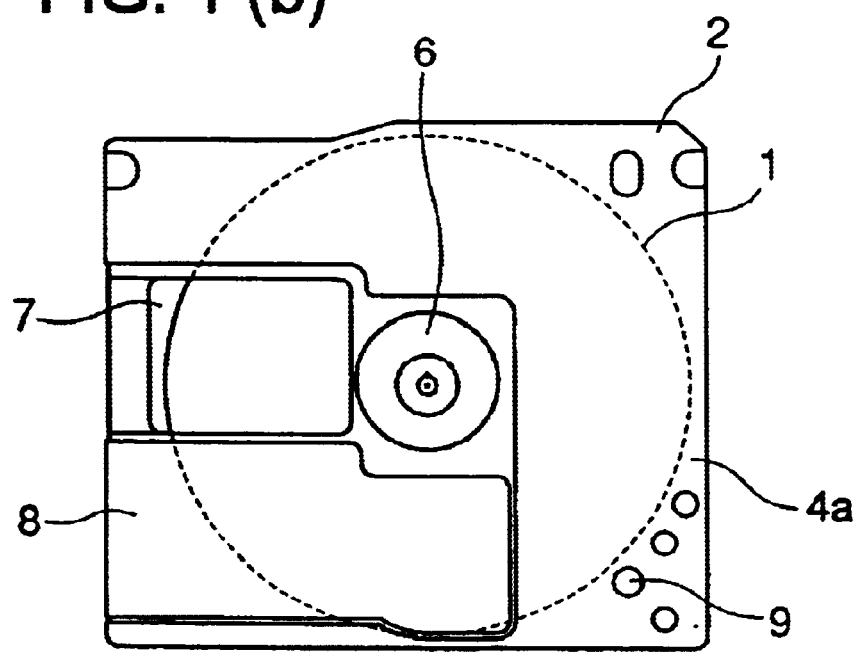

The present invention provides a disc cartridge comprising a disc and a cartridge rotatably storing the disc and having an opening provided in a region including a position corresponding to a predetermined rotation center of the disc, wherein the opening is offset in a forward direction of inserting the disc cartridge from the position corresponding to the rotation center.

In this disc cartridge, the opening may have a circular or elongated hole shape, and has a center offset in a forward direction of inserting the disc cartridge from the position corresponding to the rotation center.

The present invention also provides a disc cartridge comprising a disc and a cartridge rotatably storing the disc and having an opening provided in a region including a position corresponding to a predetermined rotation center of the disc, wherein the opening is opened longer in a forward direction of inserting the disc cartridge from the position corresponding to the rotation center than in a backward direction along a straight line passing through the position corresponding to the rotation center and parallel to the direction of inserting the disc cartridge.

In this disc cartridge, the opening may be opened larger in the direction of inserting the disc cartridge than in a direction vertical to the direction of inserting the disc cartridge.

Further, the present invention provides a disc cartridge at least including a disc and a cartridge rotatably storing the disc and being mounted in a disc apparatus having a turntable and an opening to which the turntable faces, wherein the opening forms a gap in a radial direction of the disc between the turntable and a sidewall surface of the opening, the gap being larger in a forward direction of inserting the disc cartridge than in a backward direction as the disc cartridge is mounted in the disc apparatus.

In the case of that the disc apparatus has a shaft, and the cartridge has a reference hole to be fitted with the shaft, the gap between the furntable and the sidewall surface of the opening may be larger than ½ of the size of the reference hole in the direction of inserting the disc cartridge.

Still further, the present invention provides a disc apparatus comprising a disc cartridge at least including a disc and a cartridge rotatably storing the disc, and a disc driving body having a turntable and mounting the disc cartridge, wherein the disc driving body includes a shaft and a cartridge holder, the cartridge has a reference hole for positioning the disc cartridge at the mounting of it, the cartridge holder having a pivoting point and an opening which is formed on a backward side along a direction of inserting the disc cartridge from the pivoting point, and turning on the pivoting point to allow the turntable to be fitted into the opening and the shaft to be inserted in the reference hole.

In this disc apparatus, the opening may form a gap in a radial direction of the disc between the turntable and a sidewall surface of the opening at a forward side in the direction of inserting the disc cartridge, the gap being larger than ½ of the size of the reference hole in the direction of inserting the disc cartridge.

The disc driving body may further comprise a restriction means for restricting the degree of insertion of the disc cartridge so that the disc cartridge and the turntable are prevented from contacting each other at a backward side in the direction of inserting the disc cartridge at the mounting of if.

An embodiment of the present invention will be now described in conjunction with the accompanying drawings.

FIG. 1(a) is a bottom view of a disc cartridge according to one embodiment of the present invention with the shutter being closed. FIG. 1(b) is a bottom view of thereof with the shutter being open.

In FIGS. 1(a) and 1(b), the disc cartridge 2 includes a cartridge (upper shell 4, which is not shown, and a lower shell 4a), a shutter 8. In the disc cartridge 2, a magneto-optical disc 1 recorded with information signals is rotatably stored. The upper shell 4 has a first opening (not shown) to which a magnetic head (not shown) for recording/reproducing information signals faces. The lower shell 4a has a second opening 6 to which a spindle motor 13 for rotatably holding the magneto-optical disc 1 faces, and a third opening 7 to which a pick up unit (not shown) for recording/reproducing information signals faces. The disc cartridge 2 as a whole is mounted into a magneto-optical recording/reproducing apparatus for recording/reproducing information.

According to this embodiment, the second opening 6 is formed into a circular shape, the center P1 of which is offset to a forward direction of inserting the disc cartridge 2 (in the Y-direction in FIG. 1(a)) from a position P2 corresponding to the standard rotation center of the magneto-optical disc 1. Herein, the position P2 corresponding to the standard rotation center of the magneto-optical disc 1 refers to a position corresponding to the rotation center of the magneto-optical disc pre-set for the disc cartridge 2 based on a standard or the like. The actual rotation center of the magneto-optical disc 1 is provided movably to the disc cartridge 2.

In this structure, when the disc cartridge 2 is mounted to the magneto-optical recording/reproducing apparatus, the center of the second opening 6 is offset to the forward direction of inserting the disc cartridge from the center of the turntable 15.

Figure 2:
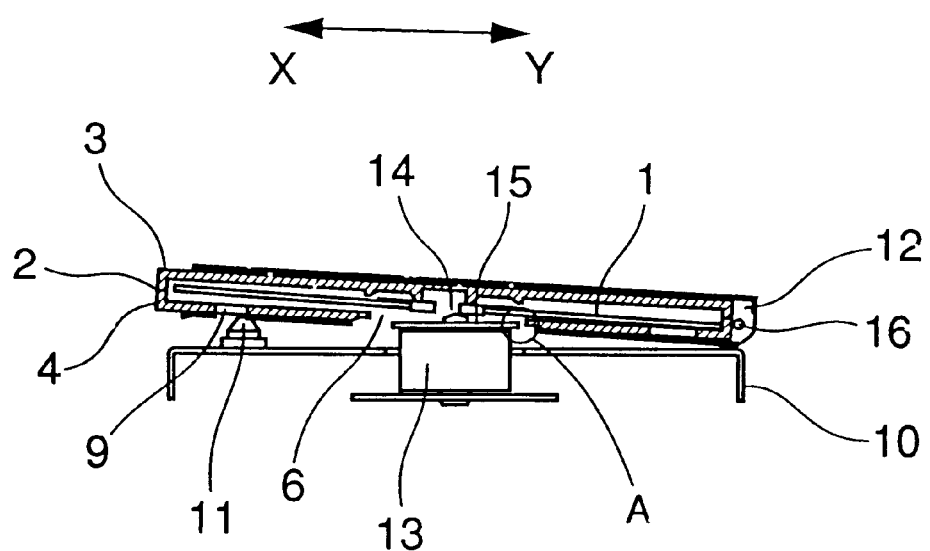
FIG. 2 is a side view for use in illustration of how the disc cartridge according to the present invention is mounted to the apparatus.

A top loading method, one method for mounting the magneto-optical disc into the magneto-optical recording/reproducing apparatus, will be now described in conjunction with FIG. 2.

The main chassis 10 of the magneto-optical recording/reproducing apparatus is attached with the spindle motor 13 and a cartridge holder 12 which holds and mounts the disc cartridge 2. The cartridge holder 12 has an approximately box-like shape and has an opening on a backward side along the direction of inserting the disc cartridge 2 (in the X-direction in FIG. 2) so as to insert the disc cartridge 2. On the backward side along the direction of inserting the disc cartridge 2 (in the Y-direction in FIG. 2), there is provided the pivotting point 16 of the cartridge holder 12, and the disc cartridge 2 can be attached/detached to/from the apparatus by rotating the cartridge holder 12. The main chassis 10 is provided with a reference shaft 11 having its positional relation with the spindle motor 13 controlled. The shaft is fitted into a reference hole 9 provided at the disc cartridge 2 for positioning.

The disc cartridge 2 is loaded as follows. As the cartridge holder 12 is uplifted, the disc cartridge 2 is pressed into the cartridge holder 12, and then the cartridge holder 12 is gradually lowered, so that the reference shaft 11 and the center hole of the magneto-optical disc 1 are fitted with the reference hole 9 and the rotary shaft 14 of the spindle motor, respectively. Thus, the loading is completed.

The reference shaft 11 described above has a tapered tip end, and therefore the reference hole 9 of the disc cartridge 2 can slide along the tip end of the reference shaft 11 in the case where the disc cartridge 2 has not been sufficiently pressed in, so that the cartridge can be mounted to the apparatus.

At this time, in the disc cartridge 2 having the offset second opening 6 according to the embodiment, when the reference hole 9 of the disc cartridge 2 slides along the tapered tip end of the reference shaft 11 of the main chassis 10, the disc cartridge 2 can be mounted without colliding against the turntable 15.

Note that in this embodiment, since the second opening 6 is smaller on the backward side along the direction of inserting the disc cartridge 2 (on the X-direction side) with respect to a position corresponding to the standard rotation center than on the forward side along the direction of inserting the disc cartridge 2 (on the Y-direction side), over-pressing the disc cartridge 2 in loading can cause the turntable 15 and the disc cartridge 2 to collide against each other on the backward side along the direction of inserting the disc cartridge 2 (on the X-direction side). This can be prevented by providing means for restricting the degree of insertion of the disc cartridge 2. For example, there may be a pin for preventing the cartridge holder 12 from being over-pressed to the inside, or the sidewall surface of the cartridge holder 12 on the forward side along the direction of inserting the disc cartridge may be set at an appropriate position (i.e., at a position which does not allow the disc cartridge 2 to be over-pressed).

A specific example will next be described. For example, in FIGS. 1(a) and 1(b), assume that the diameter of the second opening 6 is 14.4 mm, and that the diameter of the turntable 15 of the spindle motor 13 in FIG. 2 is 12 mm. Also assume that the offset between the position corresponding to the standard rotation center of the magneto-optical disc 1 and the center of the second opening is 0.3 mm. In this case, as the disc cartridge is mounted to the apparatus, the gap in the radial direction of the disc between the turntable 15 and the sidewall surface of the second opening 6 is 1.5 mm on the forward side in the direction of inserting the disc cartridge and 0.9 mm at the backward side. Here, if the diameter of the reference hole 9 is 1.25 mm, the maximum value tolerated for the shift degree between the center of the reference hole 9 and the tip end of the reference shaft 11 in order to allow the reference shaft 11 to be inserted to the reference hole 9 is 1.25 mm. In this case, the gap (1.5 mm) in the radial direction of the disc between the turntable 15 and the sidewall surface of the second opening 6 at the forward side in the direction of inserting the disc cartridge is greater than the maximum shift described above. Therefore, if the shift is about a degree which allows the reference shaft 11 to be inserted to the reference hole 9, the turntable 15 and the disc cartridge 2 can be prevented from contacting each other on the forward side in the direction of inserting the disc cartridge.

As explained in the foregoing, according to the embodiment, collision between the disc cartridge and the turntable at the loading of the disc cartridge can be prevented.

In addition, on a straight line through a position corresponding to the standard rotation center and parallel to the direction of inserting the disc cartridge, the second opening is shorter on the backward side in the direction of inserting the disc cartridge with respect to the position corresponding to the rotation center than on the backward side in the direction of inserting the disc cartridge, so that the strength of the disc cartridge will not be overly reduced. The size of the shutter covering the second opening is not excessively increased either.

Furthermore, when the disc cartridge is mounted to the turntable, the gap in the radial direction of the disc between the turntable and the sidewall surface of the second opening is set to be greater than the radius of the reference hole (½ the size of the disc cartridge in the direction) of inserting the disc cartridge, so that the turntable and the disc cartridge can be surely prevented from contacting each other on the forward side in the direction of inserting the disc cartridge. Note that at this time, if the radius of the reference hole is set to be greater than the difference in size between the second opening and the turntable in the direction of inserting the disc cartridge, the tolerance for the positional deviation between the center of the reference hole and the tip end of the reference shaft at the time of mounting can be increased.

A variation of the disc cartridge described above in conjunction with FIGS. 1(a) and 1(b) will be now described.

Figure 3:
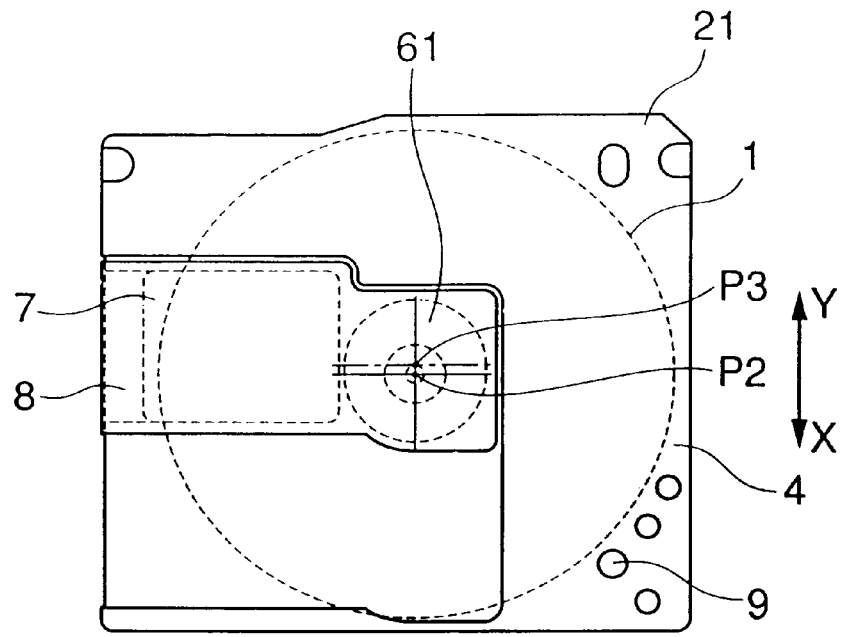
FIGS. 3(a) and 3(b) are bottom views of a disc cartridge according to a variation of the present invention.
Figure 3:
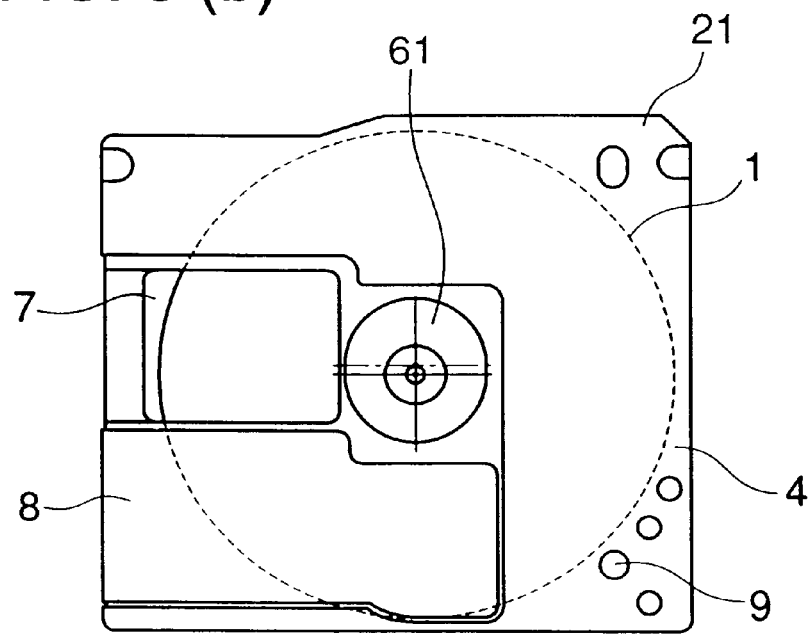

FIG. 3(a) is a bottom view of a disc cartridge 21 according to a first variation with its shutter being closed. FIG. 3(b) is a bottom view of the disc cartridge 21 with the shutter being open. In FIGS. 3(a) and 3(b), the same portions as those in FIGS. 1(a) and 1(b) are denoted with the same reference characters and will not be described or will be only briefly described.

In this variation, a second opening 61 is an elongated hole formed by connecting a circle centered at a position P2 corresponding to the standard rotation center of the magneto-optical disc 1, i.e., at a point in coincidence with the rotation center of the spindle motor 13, and a circle (centered at P3) offset to the forward side in the direction of inserting the disc cartridge from the circle.

More specifically, if the second opening 61 is for example an elongated hole formed by connecting a circle having a diameter of 14 mm and centered at the position P2 corresponding to the standard rotation center of the magneto-optical disc, and a circle having a diameter of 14 mm and centered on the position P3 offset from the rotation center P2 to the forward side in the direction of inserting the disc cartridge (in the Y-direction) by 0.5 mm, and the diameter of the turntable 15 of the spindle motor 13 is 12 mm, the gap on the forward side in the direction of inserting the disc cartridge is 1.5 mm and the gap on the backward side is 1 mm as the disc cartridge is mounted to the apparatus.

This structure provides the same effect as that described in conjunction with FIGS. 1(a) and 1(b). Also in this structure, the size of the second opening 61 in the direction vertical to the direction of inserting the disc cartridge 21 is smaller than the size in the direction of inserting the disc cartridge, and therefore the strength of the disc cartridge 21 can be maintained at a high level.

FIGS. 4(a) and 4(b) show another variation of the disc cartridge according to the embodiment. FIG. 4(a) is a bottom view of the disc cartridge 22 with its shutter being closed. FIG. 4(b) is a bottom view of the disc cartridge 22 with the shutter being open.

Figure 4:
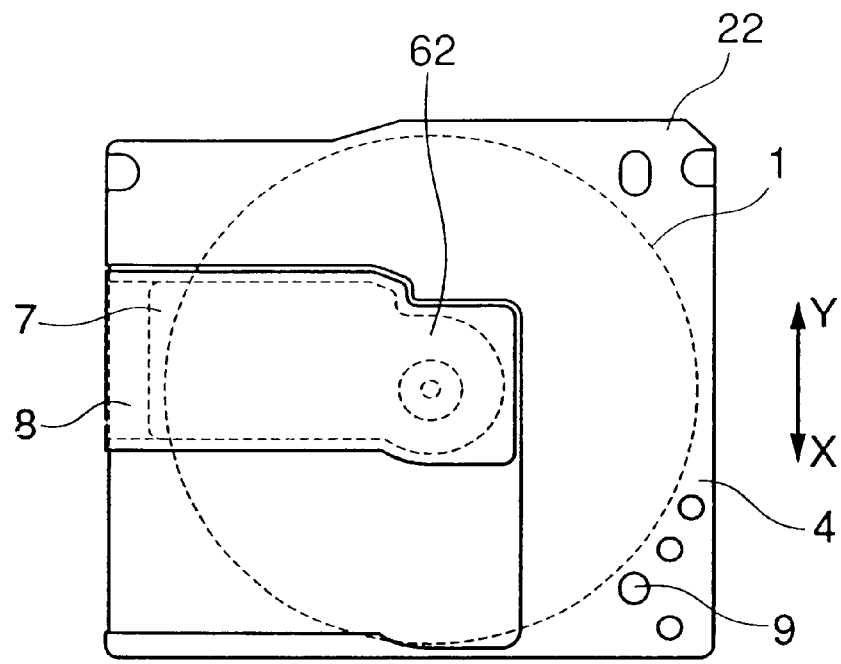
FIGS. 4(a) and 4(b) are bottom views of a disc cartridge according to another variation of the present invention.
Figure 4:
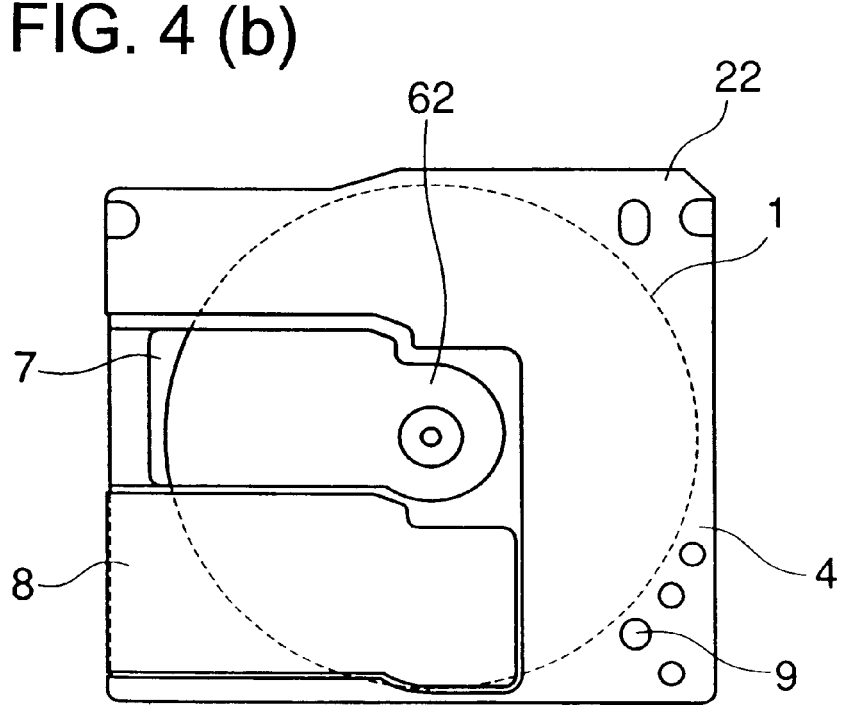

In the disc cartridge 22 shown in FIG. 4, a second opening 62 is formed by connecting the second opening 6 and the third opening 7 in the disc cartridge 2 as shown in FIGS. 1(a) and 1(b).

Figure 5:
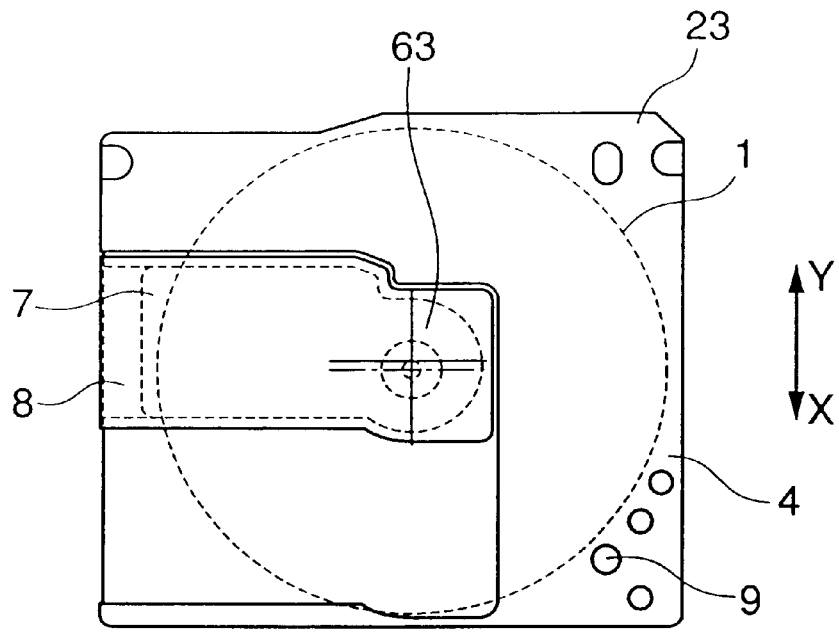
FIGS. 5(a) and 5(b) are bottom views of a disc cartridge according to yet another variation of the present invention.
Figure 5:
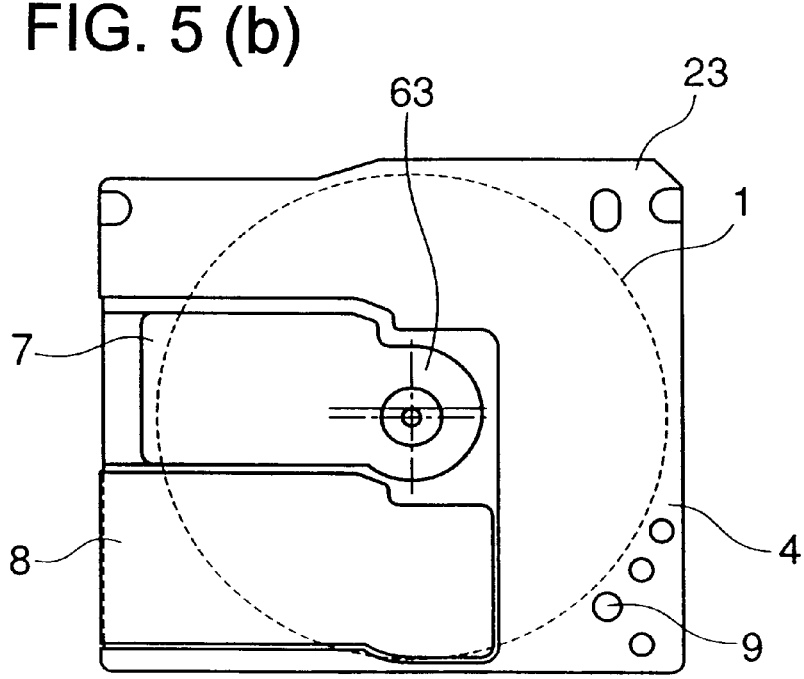
Figure 7:
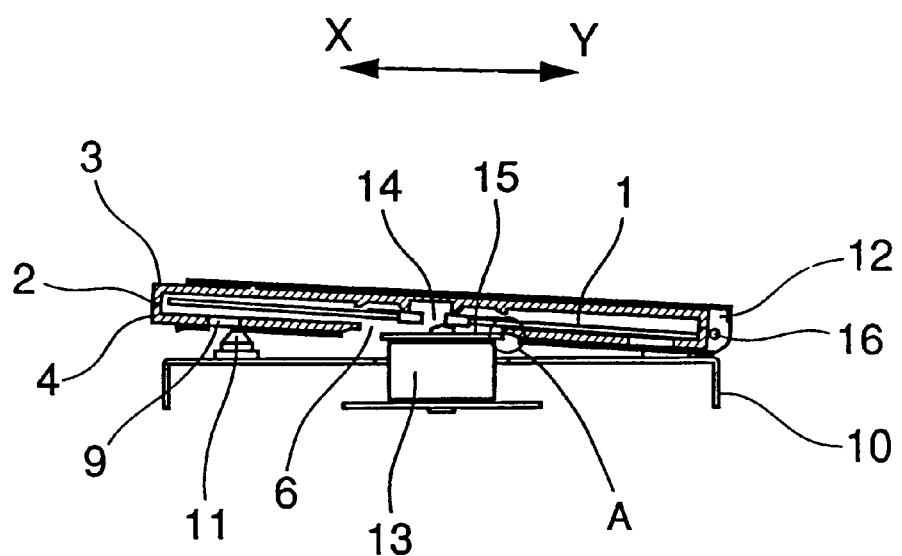
FIG. 7 is a side view for use in illustration of how the conventional disc cartridge is mounted to an apparatus.

FIGS. 5(a) and 5(b) show yet another variation of the disc cartridge according to the embodiment. FIG. 5(a) is a bottom view of the disc cartridge 23 with its shutter being closed, and FIG. 5(b) is a bottom view of the disc cartridge 23 with the shutter being open.

The second opening in the disc cartridge 23 shown in FIGS. 5(a) and 5(b) is formed by connecting the second opening 61 and the third opening 7 in the disc cartridge 21, as shown in FIG. 2.

In the foregoing, disc cartridges storing a magneto-optical disc and magneto-optical recording/reproducing apparatuses have been described by way of illustration. Meanwhile, the present invention is also applicable to a disc such as an optical disc and a magnetic disc, and to a disc unit having a turntable for placing such a disc (such as a recording/reproducing apparatus which executes at least one of reproducing, recording and erasure from/to the disc).

According to the present invention, the opening provided at the portion including the position corresponding to the rotation center of the disc in the disc cartridge is formed to be longer on the far side in the direction of inserting the disc cartridge with respect to the position corresponding to the rotation center than on the backward side in the direction of inserting the disc cartridge along the straight line through the position corresponding to the rotation center and parallel to the direction of inserting the disc cartridge. Therefore, the disc cartridge can be prevented from colliding against the turntable when it (the disc cartridge) is mounted.

Since the opening is formed to be larger in the direction of inserting the disc cartridge than in the direction vertical to the direction of inserting the disc cartridge, the opening does not have to be excessively large, which increases the strength of the disc cartridge.

In addition, the size of the positioning hole is set larger than the gap in the radial direction of the disc between the turntable and the sidewall surface of the opening, so that the disc cartridge can be surely prevented from colliding against the turntable when it (the disc cartridge) is mounted.

Furthermore, in a disc apparatus which loads the disc cartridge as described above in the top loading method, a restriction means for restricting the disc cartridge from being inserted too for is provided. Therefore, if the size of the opening on the backward side in the insertion direction is reduced, the cartridge and the turntable can be prevented from contacting each other in that direction.

What is claimed is:

1. A disc cartridge comprising:
   a disc and a disc cartridge body rotatably accommodating the disc, and having an opening which is provided in a region including a position corresponding to a predetermined rotation center of the disc, and to which a turntable faces when the disc cartridge is mounted in a disc apparatus having the turntable,
   wherein the opening in the disc cartridge is offset in a forward direction of inserting the disc cartridge from the position corresponding to the rotation center of the disc.

2. The disc cartridge according to claim 1, wherein the opening is circular, and has a center offset in a forward direction of inserting the disc cartridge from the position corresponding to the rotation center of the disc.

3. A disc cartridge comprising:
   a disc and a disc cartridge body rotatably accommodating the disc, and having an opening which is provided in a region including a position corresponding to a predetermined rotation center of the disc, wherein
   the opening is opened longer in a forward direction of inserting the disc cartridge from the position corresponding to the rotation center than in a backward direction along a straight line passing through the position corresponding to the rotation center and parallel to the direction of inserting the disc cartridge.

4. The disc cartridge according to claim 3, wherein the opening is larger in the direction of inserting the disc cartridge than in a direction vertical to the direction of inserting the disc cartridge.

5. A disc cartridge comprising:
   a disc and a disc cartridge body rotatably accommodating the disc and having an opening to which a turntable faces when the disc cartridge is mounted in a disc apparatus having the turntable, wherein
   the opening forms a gap in a radial direction of the disc between the turntable and a sidewall surface of the opening, the gap being larger in a forward direction of inserting the disc cartridge than in a backward direction as the disc cartridge is mounted in the disc apparatus.

6. The disc cartridge according to claim 5, wherein the disc apparatus has a shaft, the disc cartridge body has a reference hole to be fitted with the shaft, and the gap between the turntable and the sidewall surface of the opening is larger ½ of the size of the reference hole in the direction of inserting the disc cartridge.

7. A disc apparatus comprising:
   a disc and a disc cartridge body rotatably accommodating the disc, and a disc driving body having a turntable and mounting the disc cartridge,
   wherein the disc driving body includes a shaft and a cartridge holder,
   the disc cartridge body has a reference hole for positioning the disc cartridge at the mounting of it,
   the cartridge holder having a pivoting point and an opening which is formed on a backward side along a direction of inserting the disc cartridge from the pivoting point, and turning on the pivoting point to allow the turntable to be fitted into the opening and the shaft to be inserted in the reference hole; wherein
   the opening forms a gap in a radial direction of the disc between the turntable and a sidewall surface of the opening at a forward side in the direction of inserting the disc cartridge, the gap being larger than ½ of the size of the reference hole in the direction of inserting the disc cartridge.

8. The disc apparatus according to claim 7, wherein the disc driving body further comprises a restriction means for restricting the degree of insertion of the disc cartridge so that the disc cartridge and the turntable are prevented from contacting each other at a backward side in the direction of inserting the disc cartridge at the mounting of it.

9. The disc cartridge according to claim 1, wherein the opening has an elongated hole shape, and has a center offset in a forward direction of inserting the disc cartridge from the position corresponding to the rotation center of the disc.

10. The disc cartridge of claim 1, wherein the opening is totally surrounded by a portion of a bottom of the disc cartridge body.

* * * * *